(12) United States Patent
Yin et al.

(10) Patent No.: US 8,228,825 B2
(45) Date of Patent: Jul. 24, 2012

(54) DELIVERING UNIFIED USER EXPERIENCE BY AUTOMATICALLY TEAMING UP INFORMATION APPLIANCES WITH GENERAL PURPOSE PC THROUGH INTERNET

(75) Inventors: Min Yin, Sunnyvale, CA (US); Shumin Zhai, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 971 days.

(21) Appl. No.: 12/128,805

(22) Filed: May 29, 2008

(65) Prior Publication Data
US 2008/0291900 A1 Nov. 27, 2008

Related U.S. Application Data

(63) Continuation of application No. 11/668,054, filed on Jan. 29, 2007.

(51) Int. Cl.
*H04L 12/66* (2006.01)

(52) U.S. Cl. ........ 370/271; 370/352; 370/353; 370/354; 370/355; 370/356; 717/168; 717/170; 717/171; 717/172; 717/173; 717/174; 717/175; 717/176; 717/178; 709/222; 709/227; 379/201.01; 379/201.05; 379/201.08

(58) Field of Classification Search .......... 370/352–356, 370/271, 485; 709/222, 227; 717/168–178
See application file for complete search history.

(56) References Cited

U.S. PATENT DOCUMENTS

| | | | | |
|---|---|---|---|---|
| 5,938,730 A | * | 8/1999 | Tobita | 709/224 |
| 6,094,673 A | * | 7/2000 | Dilip et al. | 709/202 |
| 6,243,452 B1 | | 6/2001 | O'Shaughnessey et al. | |
| 6,707,811 B2 | * | 3/2004 | Greenberg et al. | 370/352 |
| 7,171,390 B1 | * | 1/2007 | Song et al. | 705/52 |
| 7,643,435 B1 | * | 1/2010 | Chang | 370/259 |
| 7,779,034 B2 | * | 8/2010 | Pedersen et al. | 707/781 |
| 2003/0108176 A1 | | 6/2003 | Kung et al. | |
| 2004/0125794 A1 | * | 7/2004 | Marquette et al. | 370/355 |
| 2004/0165713 A1 | | 8/2004 | Leighton | |
| 2005/0018657 A1 | * | 1/2005 | Nakao et al. | 370/352 |
| 2005/0021626 A1 | * | 1/2005 | Prajapat et al. | 709/205 |
| 2005/0047395 A1 | | 3/2005 | Narin et al. | |
| 2005/0180403 A1 | * | 8/2005 | Haddad et al. | 370/352 |
| 2005/0198239 A1 | * | 9/2005 | Hughes | 709/222 |
| 2006/0010368 A1 | * | 1/2006 | Kashi | 715/512 |
| 2007/0186002 A1 | * | 8/2007 | Campbell et al. | 709/231 |
| 2007/0208834 A1 | * | 9/2007 | Nanamura et al. | 709/220 |
| 2008/0222295 A1 | * | 9/2008 | Robinson et al. | 709/227 |
| 2009/0298490 A9 | * | 12/2009 | Janik | 455/419 |

OTHER PUBLICATIONS

"Computer Telephony Integration", Wikipedia, retrieved Dec. 1, 2006, pp. 1-4.

* cited by examiner

*Primary Examiner* — Joe Cheng
*Assistant Examiner* — Wutchung Chu
(74) *Attorney, Agent, or Firm* — Cantor Colburn LLP; Brian Lambert

(57) ABSTRACT

An embodiment of the present invention is a method for server side integration of communication devices and the general purpose PC of the same user through a computer network wherein no physical connection is required between the PC and the communication device. The user registers with PnC (phone and computer) server for subscribing to one or more PnC services such as drop-to-call, conference-call-dropping service, webpage sharing, caller kaleidoscope etc., via user interface of communications device and/or PC. Various features for subscribing and unsubscribing to services are provided along with authenticating the user using the name and the phone number of the user while registering with the server.

7 Claims, 11 Drawing Sheets

DELIVERING UNIFIED USER EXPERIENCE BY AUTOMATICALLY TEAMING UP INFORMATION APPLIANCES WITH GENERAL PURPOSE PC THROUGH INTERNET

CROSS REFERENCE TO RELATED APPLICATIONS

This application is a continuation of U.S. patent application Ser. No. 11/668,054 filed Jan. 29, 2007, the contents of which are incorporated by reference herein in their entirety.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to a method for server side integration of communication devices and the general purpose PC of the same user through a computer network wherein no physical connection is required between the PC and the communication device. In particular, the user registers with PnC (phone and computer) server for subscribing to one or more PnC services such as drop-to-call, conference-call-dropping service, webpage sharing, caller kaleidoscope etc., via user interface of communications device and/or PC. Various features for subscribing and unsubscribing to services are provided along with authenticating the user using the name and the phone number of the user while registering with the server.

2. Description of Background

Information appliances are special purpose computers dedicated to particular functions. For example, IP Phones are designed primarily for voice communication, but with its computation power and a screen, IP Phones can also be used to query a directory, broadcast messages, or surf the web.

There are efforts on making the general purpose PC more versatile and take over information appliances, either virtually (through software) or physically (through hardware). For example, many soft phones have been developed and U.S. Pat. No. 6,035,214 describes physically incorporating a phone into a laptop.

But despite these efforts, as technology advances, our office desks are equipped with even more powerful (regarding CPU, memory, storage, screen, and Internet connectivity) information appliances, usually sitting near a general PC (desktop or laptop). This is because information appliances offer advantages a general PC can not provide, including high reliability, easy maintenance, and form factors targeted at special tasks.

Although an information appliance and general purpose PC are both present at the same user's desk, they work by themselves, not aware of the other one's presence. This can be very inconvenient to the user. For example, to dial a number listed in an email, a file, or a webpage in the general purpose PC, the user has to first memorize the number and then manually punch them on the phone. In contrast, to team up information appliances and a general purpose PC as a group enables smooth and seamless information flow and optimized resource allocation and function distribution.

Some prior art proposes to physically connect the PC and information appliance like devices with cable, dock, or special connectors. Physical connectors may be machine or brand specific thus may not work on other information appliances. To physically connect and/or disconnect the two may be inconvenient to the user. Bluetooth can connect two devices wirelessly, but it also requires a device discovery phase and makes no effort on delivering a unified user experience over connected devices.

There is a long felt need for a system and method that delivers a unified user experience by automatically teaming up the information appliances and the general purpose PC of the same user through an Internet-base approach that in part gives rise to the present invention.

SUMMARY OF THE INVENTION

The shortcomings of the prior art are overcome and additional advantages are provided through the provision of a method of combining a personal computer and an IP phone by way of local area network forming a device team, the method comprising: connecting an IP phone to a local area network; connecting a personal computer (PC) to the local area network; installing a PnC proxy software on the personal computer (PC), the PnC proxy software providing a plurality of user interface elements representing the IP phone to a user; processing registration, subscription, authentication, and a plurality of collaborative functions between the IP phone and the personal computer (PC) on a server running a PnC server software; and using the PnC server software to coordinate communications between, an IP phone server, the IP phone, and the PnC proxy software to effectuate the device team.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

Technical Effects

As a result of the summarized invention, technically we have achieved a solution which the user registers with PnC (phone and computer) server for subscribing to one or more PnC services such as drop-to-call, conference-call-dropping service, webpage sharing, caller kaleidoscope etc., via user interface of a communications device and/or a PC.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Turning now to the drawings in greater detail, specialized computers as information appliances have been proposed as a solution to the complexity and usability problems of the PC. There are also counter arguments against such a proposition. In an exemplary embodiment of the present invention, instead of pitting information appliances and the PC against each other, embodiments implement a device teaming approach that takes advantage of both types of devices: the familiar and high bandwidth user interface of the PC, and the task specific form factors of an information appliance.

In an embodiment of the present invention, we designed and developed a PnC (phone n' computer) by teaming up an IP phone with a general-purpose PC. Functions are distributed between the two devices according to their characteristics. Users can also transfer information objects between the two devices. PnC provides new and richer user experiences including drop-to-call, sharing visual information, and caller information display.

Information appliances, or computers designed with specialized functions and form factors, have been advocated as a solution to the ever increasing complexity and user frustration of the PC by many. Such a proposition is not without opposition. While information appliances tend to be more reliable and simpler to use, at least for the most basic functions, the general purpose PC offers savings at many levels: highly commoditized powerful hardware, space, and the time invested in learning one set of interaction skills common to all software applications.

A PC has three types of usability advantages over appliances. First, the GUI conventions and de facto standard operations help a user to rely on past experience to operate a new software application. In contrast there has been little standardization to performing operations on an appliance, particularly if the operation is beyond the most basic. For example recording a greeting message on different phones often requires different operation procedures. Second, PCs have powerful/high bandwidth input (mouse and keyboard) and output (large display) devices that most specialized devices can't have. Third, information (e.g., a phone number send over email) related to a daily task is often stored in applications on a PC that can be more easily shared among applications on the same machine.

Figure 1:
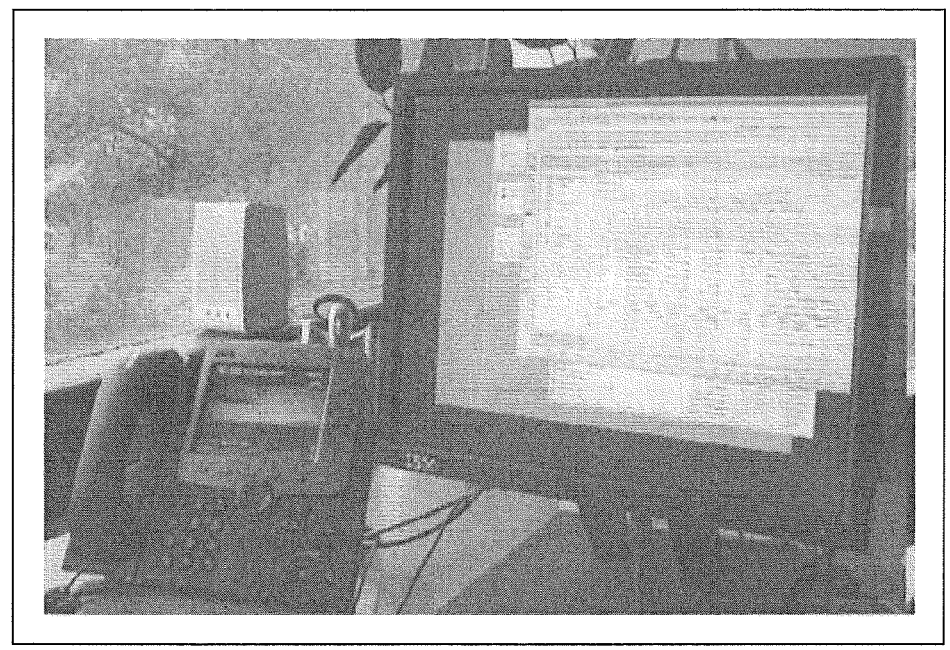
FIG. 1 illustrates one example of an IP phone and general purpose PC can form a PnC team taking advantage of both devices.

Referring to FIG. 1 there is illustrated one example of an IP phone and a general purpose PC forming a PnC team taking advantage of both devices. In an exemplary embodiment, the IP phone, rapidly deployed in many corporations due to the cost savings in networking, is a particularly interesting case of an information appliance.

First, due to its specialized purpose and narrow function, the reliability of an IP phone can be higher than a general purpose PC which can halt due to failures in the numerous programs, device drivers, and processes. The management and maintenance (e.g., software upgrade) of IP phones, especially in a large corporation, is also easier. In case of a crash, a special purpose computer reboots much faster than a PC with a complex operating system to boot and many applications to launch. Second, because of its size and form, and IP phone offer better affordances for making and receiving calls. When the phone rings, one can immediately pick up the handset of a hardware phone with a fixed location on the desk. In contrast responding to an alert from a PC often involves finding the right window, reading the message, and figuring out which control to push.

The drawbacks of an IP phone as an information appliance are also easily observable. Beyond making and receiving calls, it is often not obvious how to perform operations such as making a multi-party conference call. Without a keyboard and a large display, inputting entries to the speed dial menu/phone book is difficult. It is not convenient to copy phone numbers stored in a PC (email, web page, etc) to dial a call on the phone.

Fortunately an IP phone, as an information appliance and a general purpose PC are not necessarily mutually exclusive, especially since they can be identified with the same user on the network and are physically near each other. By teaming up information appliances with PCs, one can approach the best of both worlds: the special form, size and affordances of an information appliance and the powerful I/O and GUI capabilities of a general PC.

In an exemplary embodiment, a PnC (phone n' computer) system, as a team between a phone and a computer, provides stronger functionality and usability than each of the two devices alone. Some functions are particularly suited for the phone to handle. For example, in addition to making and receiving voice calls, calendar notifications, alerts, announcements, and data to be tracked and monitored frequently are particularly suited for the phone to display due to its spatial constancy. In contrast, when a large amount of graphical or text information needs to be displayed, or complex actions that require a large GUI and efficient input to operate, the task should go to the PC.

In an exemplary embodiment of the present invention, a function will appear either on the phone or on the PC by default in light of these analyses. Furthermore, we have developed user interfaces to support easy manual transfer of information and function between the two devices by the user.

Figure 2:
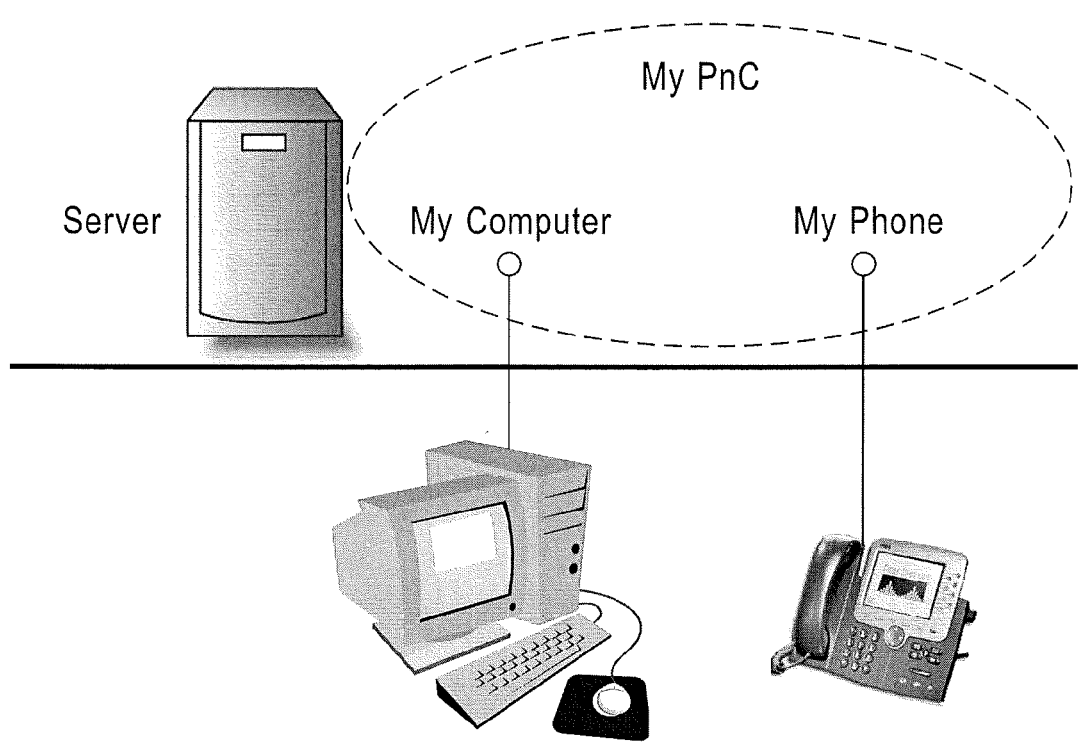
FIG. 2 illustrates one example of the computer and phone virtual integration.

One design criteria for the PnC is elimination of direct physical connection between the PC and the phone and removing additional device discovery steps before users can use the system. Instead, a server-side integration approach is used where the server, as illustrated in FIG. 2, considers the PC and the Phone of a same user as a virtual PnC team. Due to the increasing Internet connectivity, such an approach is easy, convenient, flexible, and cost effective.

Figure 3:
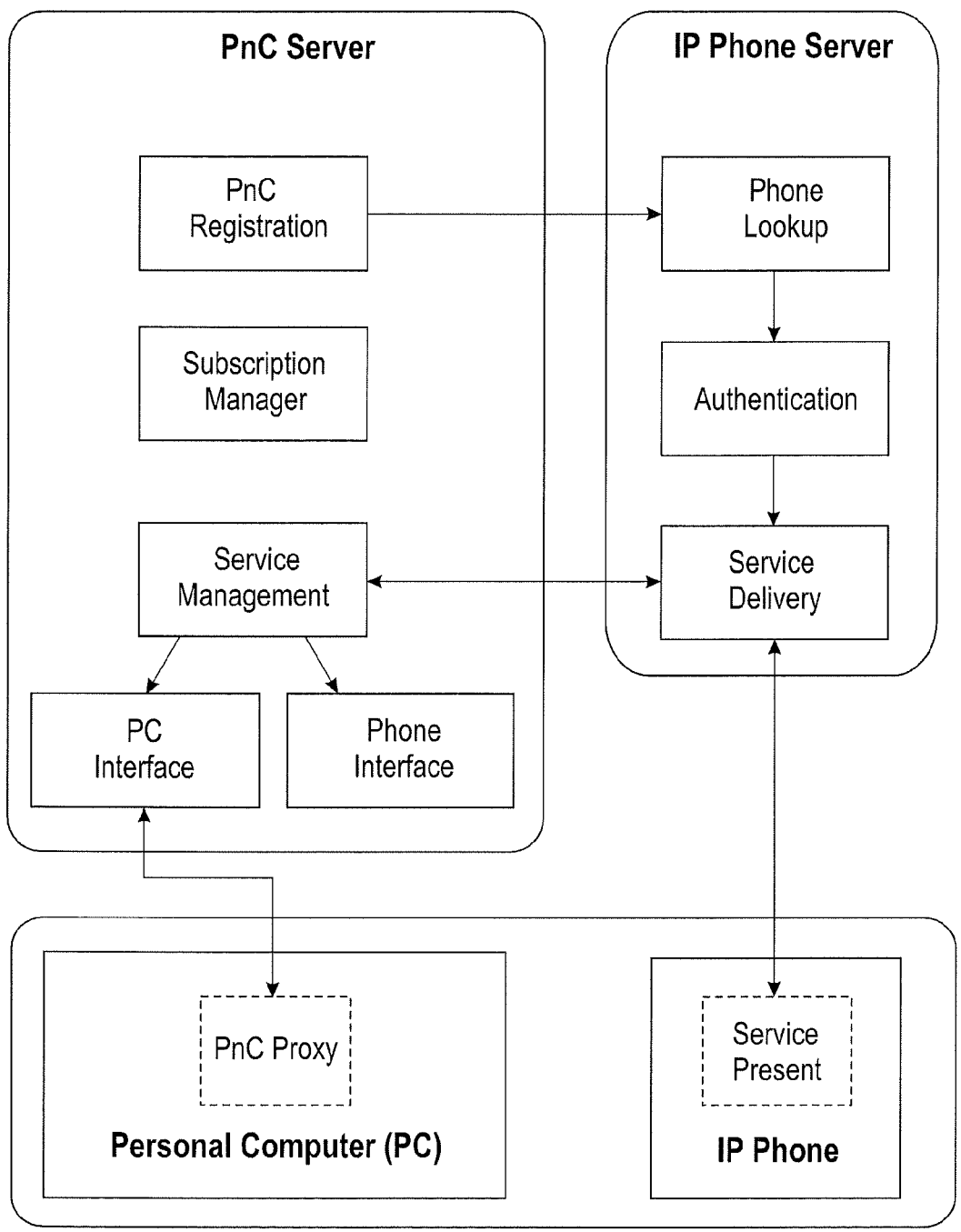
FIG. 3 illustrates one example of the PnC system view.

Referring to FIG. 3 there is illustrated one example of the PnC system view. In an exemplary embodiment this system, PnC is offered as a set of functional software services.

In operation, the user first needs to register with the PnC Server via a web interface and then subscribe to one or more PnC services, such as Drop-to-Call, Conference-call-dropping, Caller Kaleidoscope as detailed further below, Multicast for certain groups, etc. Alternative to individual registration, PnC function can be also pre-installed and configured based on information in for example a corporate database. During registration, a PnC server verifies a user's name and phone number with IP Phone Manager Server, authenticates the user by means of, for example, an intranet password, initializes the user's phone, and later delivers the subscribed services to the same phone. The PnC server keeps a list of available PnC services and a list of subscribers with their individual subscriptions. The Subscription Management Module allows a subscriber to modify, customize, or cancel his/her subscriptions. For each PnC service, the complete service delivery is defined as two parts: one delivered through the PC Interface to the subscriber's computer and the other part through the phone interface to the IP Phone. The Service Management Module manages and maintains these services to ensure their successful collaborative delivery to the PC and to the IP phone.

On the subscriber's PC, a small PnC proxy is needed to receive PnC service delivery and collect user input through the PC's keyboard and mouse. On the IP phone side, services are delivered through the standard IP phone service platform provided by the IP Phone vendor.

User Interface from the PC to the Phone

Figure 4:
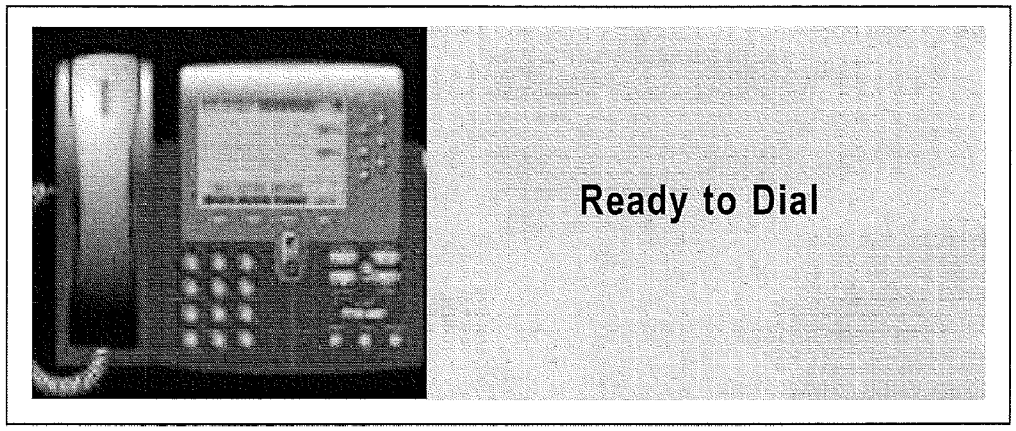
FIG. 4 illustrates one example of the graphical phone proxy on the PC desktop.

There are many possible interface designs for manually transferring information objects from the PC to the phone. One uses a "toss-over" metaphor. An edge of the PC screen near the phone is dedicated as boundary between the two devices, any objects that are dragged over the edge goes to the phone. Another interface is a pop-up menu attached to each information object that can be transferred to the phone by a right mouse click and selection. An interface design called "graphical proxy" uses a dedicated window/icon as a virtual representation of the phone on the PC screen. Any object dropped on the proxy will be interpreted and transferred to the phone. One example of which is illustrated in FIG. 4.

User Interface from the Phone to the PC

There are also many possible interface designs for transferring information objects from the phone to the PC. One embodiment is a simple button-based "shovel" mechanism. If a user presses a button with the label "To-PC", the object on the phone screen is transferred and displayed on the PC. Functions available in embodiments of the invention are described below.

Drop-to-Call

The first service is Drop-to-Call, which enables the user to drag and drop a phone number in a PC application onto the graphical phone proxy, causing the IP phone to automatically dial that number.

Drop-to-Call also allows the user to drop a directory entry onto the phone proxy. The phone will dial the number in the entry when there is no ambiguity. When multiple phone numbers (e.g., office number, mobile number, etc.) are contained in the entry, the user will be prompted to select one of them through a pop-up menu.

Sharing Web Pages

During a phone call it is common to refer to a web site for sharing some visual information. To achieve this today, one has to read the URL over the phone, which is often tedious, send an email, or open an instant text-messaging channel. A PnC function facilitates sharing web pages. During the call, either of the two parties with PnC installed can drag and drop a web page from the web browser of the PC onto the phone proxy, which causes an image of the page displayed on both phone screens. If interested in more detail, the recipient can shovel the page from the phone display to the PC screen, which displays the page in a web browser. What is transferred in the last step is really the URL of the web page, although the appearance is that the "page" is copied from one PC to another via two phones.

Caller Information Display—Kaleidoscope

When receiving a call, it is often useful to have some background information about the caller on display. There is a small bit of such information with the conventional caller ID (identification) in the form of a phone number and caller's name. A PnC service, referred to as Kaleidoscope, provides a variety of information on the caller and some collaboration and communication documents between the caller and the receiver. With this service, when one receives a call, an enhanced version of the commonly used Caller-ID is displayed on the phone screen, including: name, affiliation, email address, as well as shared calendar entry and shared activities. If interested in seeing more detailed information during the call, the receiver can shovel the information to the PC and display a full size Kaleidoscope interface on the PC screen. Depending on availability, the Kaleidoscope displays the caller's home page, corporate directory information and most recent email exchanged with the caller.

Figure 5:
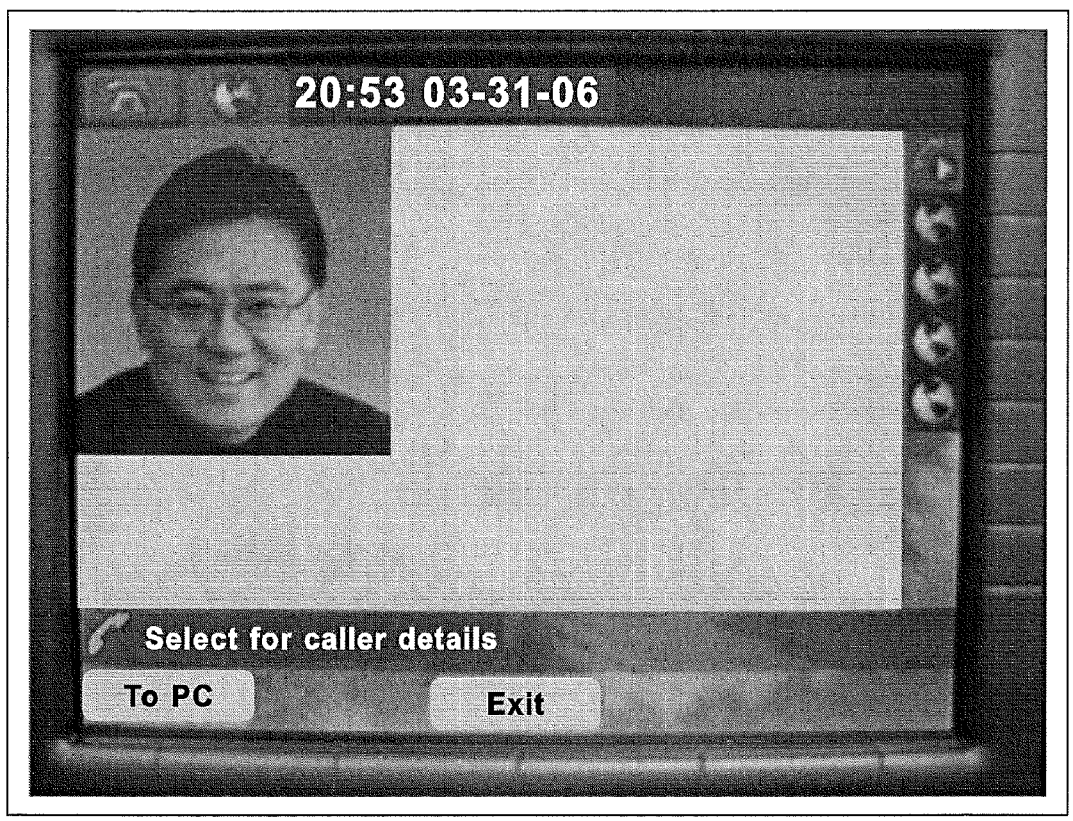
FIG. 5 illustrates one example of caller kaleidoscope phone screenshot.
Figure 6:
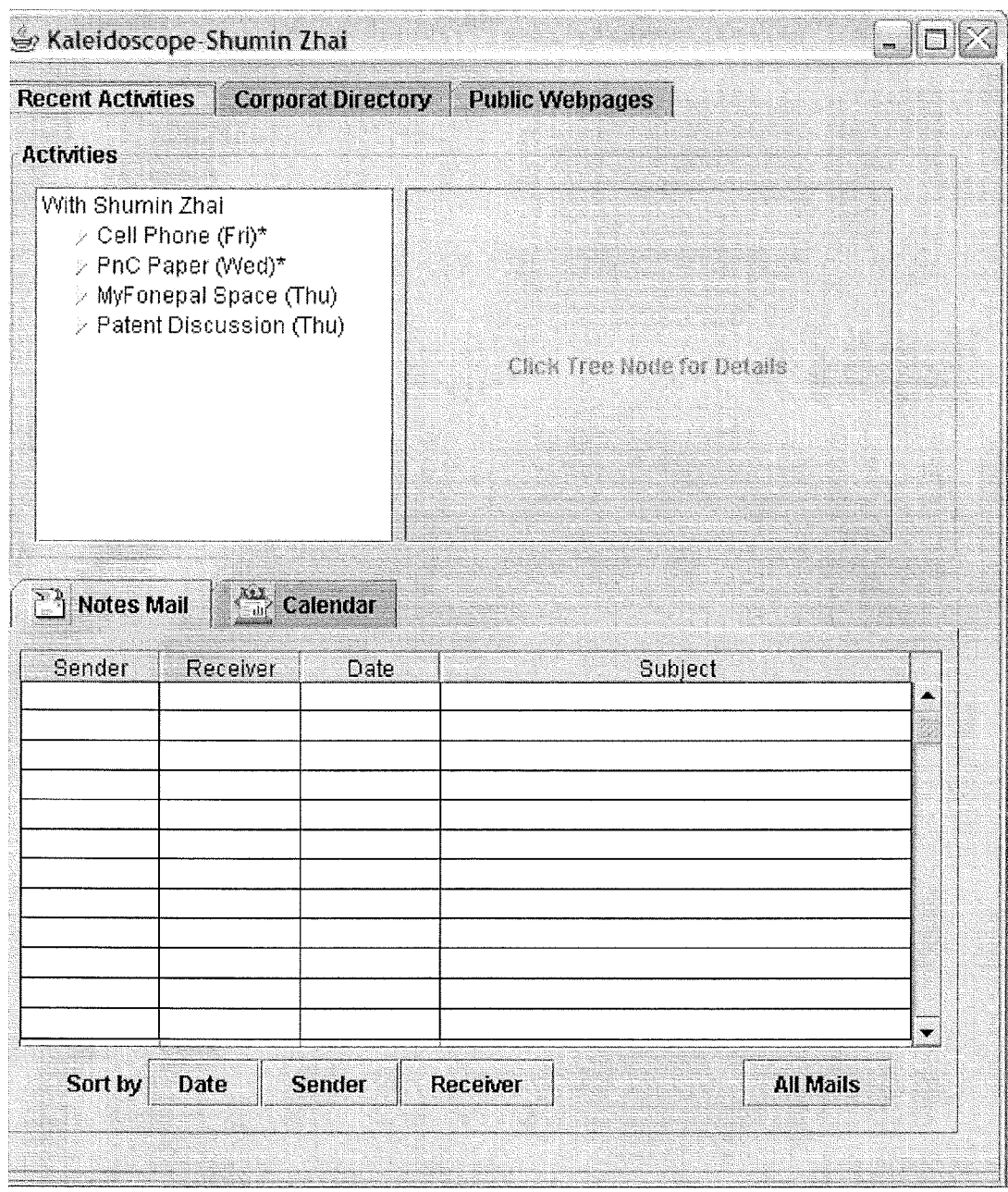
FIG. 6 illustrates one example of the caller kaleidoscope PC view.

The information displayed in Kaleidoscope is collected by the Caller Kaleidoscope service, which once subscribed, starts to monitor the inbound calls of the subscriber's IP Phone. Whenever a call comes in, the service detects the calling party's caller ID (if it is available), the service will then collect various kinds of information about the caller. This service is especially valuable in a corporate environment where information such as the caller's location, department, manager, and position can be easily found in the corporate directory. If the caller is from outside of the receiver's corporation, Caller Kaleidoscope can search information on the web and present whatever is found to the receiver. Referring to FIG. 5 there is illustrated one example of a screenshot of the caller kaleidoscope delivered to the receiver's IP Phone. A full-sized version of Kaleidoscope on the PC is illustrated in FIG. 6.

Figure 7A:
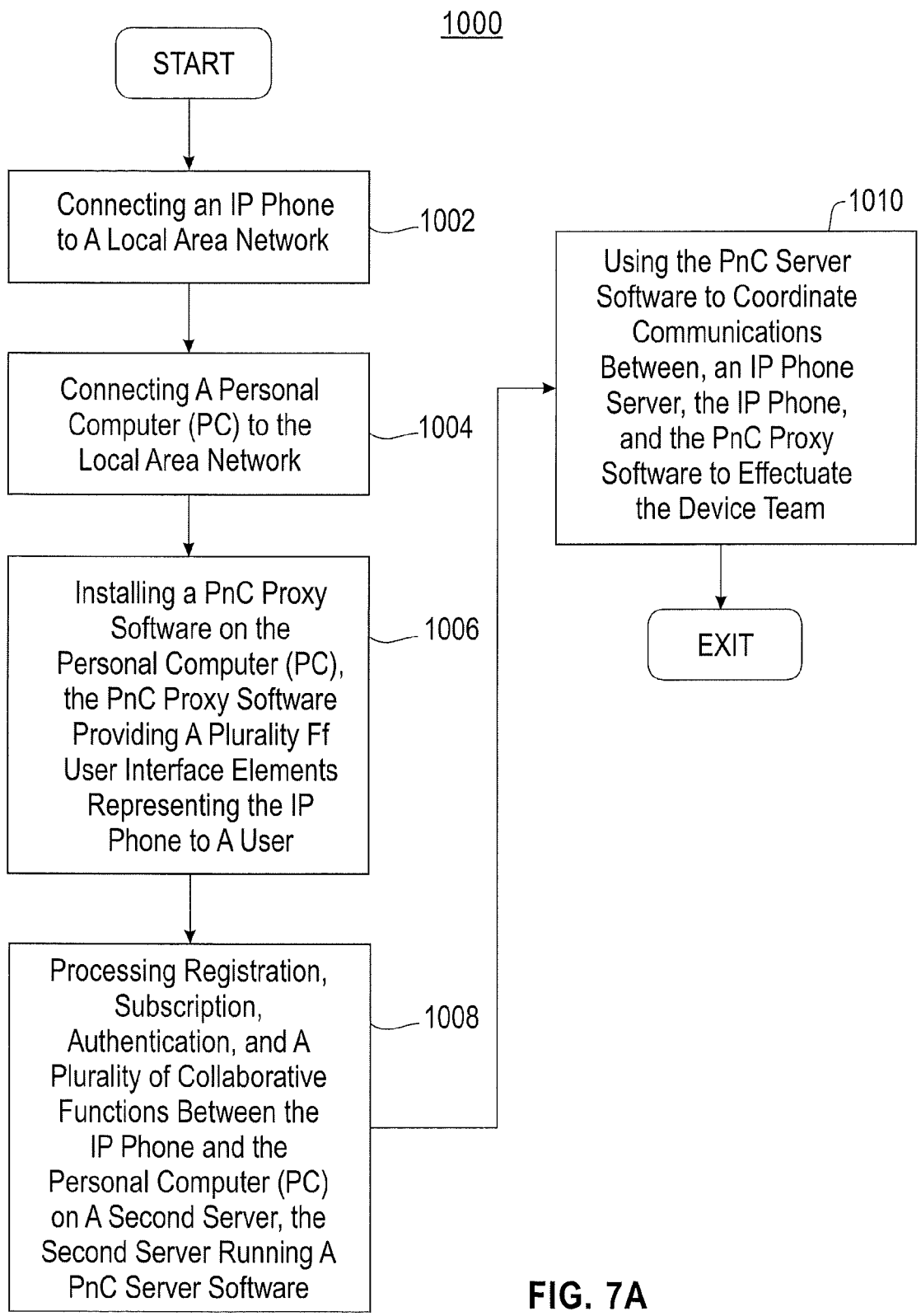
FIGS. 7A-7B illustrate one example of a method of combining personal computer and IP phone by way of local area network forming a device team.
Figure 7B:
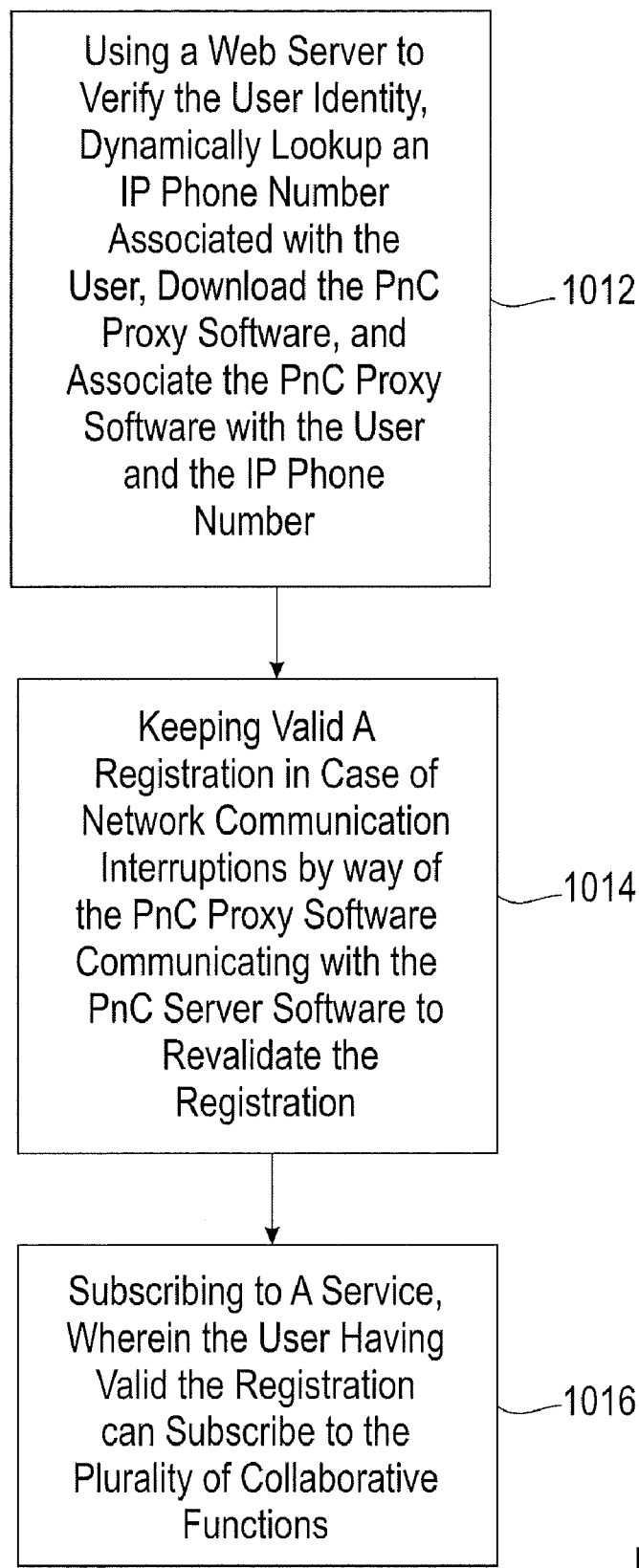

Referring to FIGS. 7A-7B there is illustrated one example of a method of combining personal computer and IP phone by way of local area network forming a device team. In this regard, FIGS. 7A-7B blocks 1002-1016 further detail an exemplary embodiment of the present invention.

Figure 8:
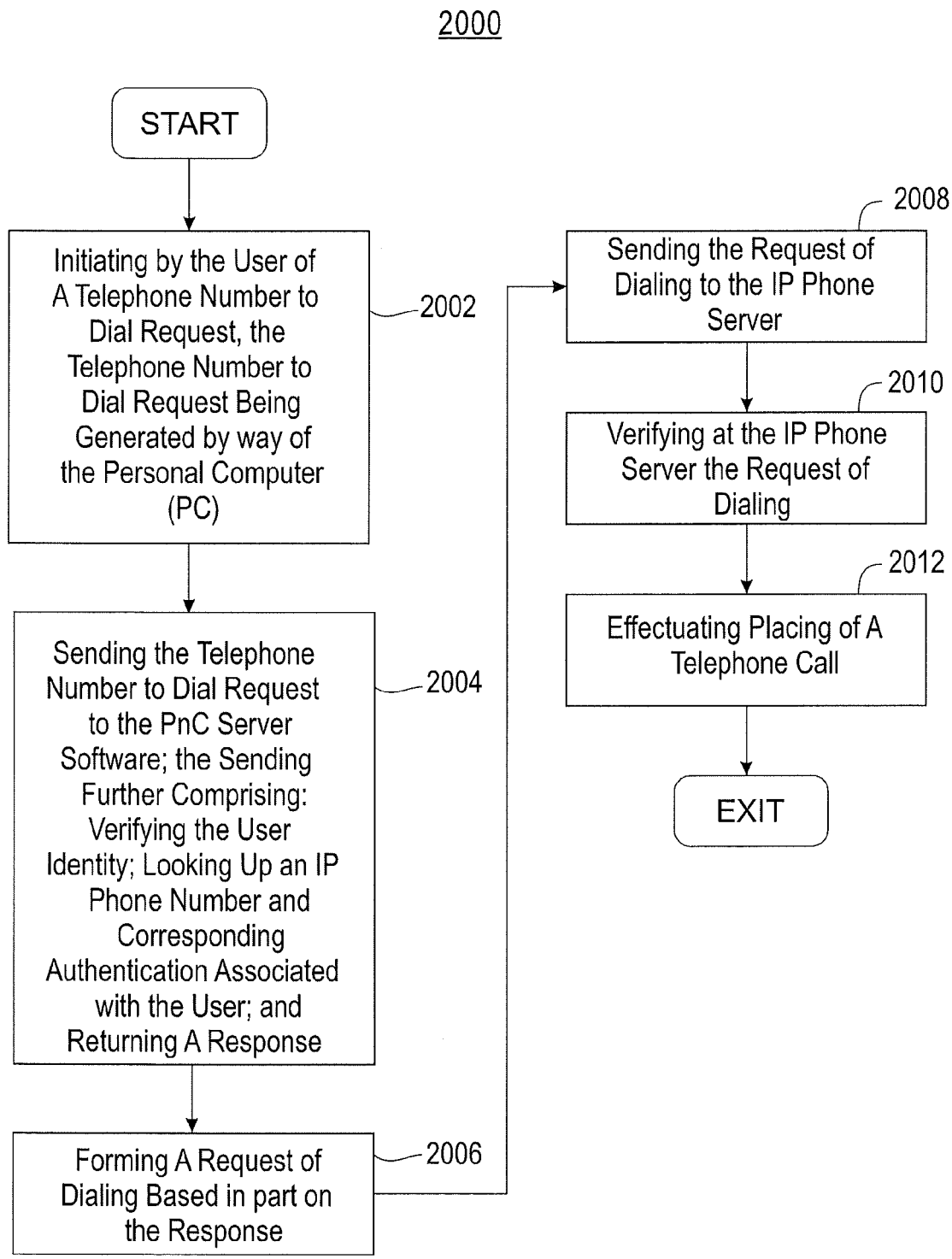
FIG. 8 illustrates one example of drop-to-dial function, which is one of a plurality of collaborative functions.

Referring to FIG. 8 there is illustrated one example of drop-to-dial function, which is one of a plurality of collaborative functions. In this regard, FIG. 8 blocks 2002-2012 further details an exemplary embodiment of the present inventions drop-to-call function.

Figure 9A:
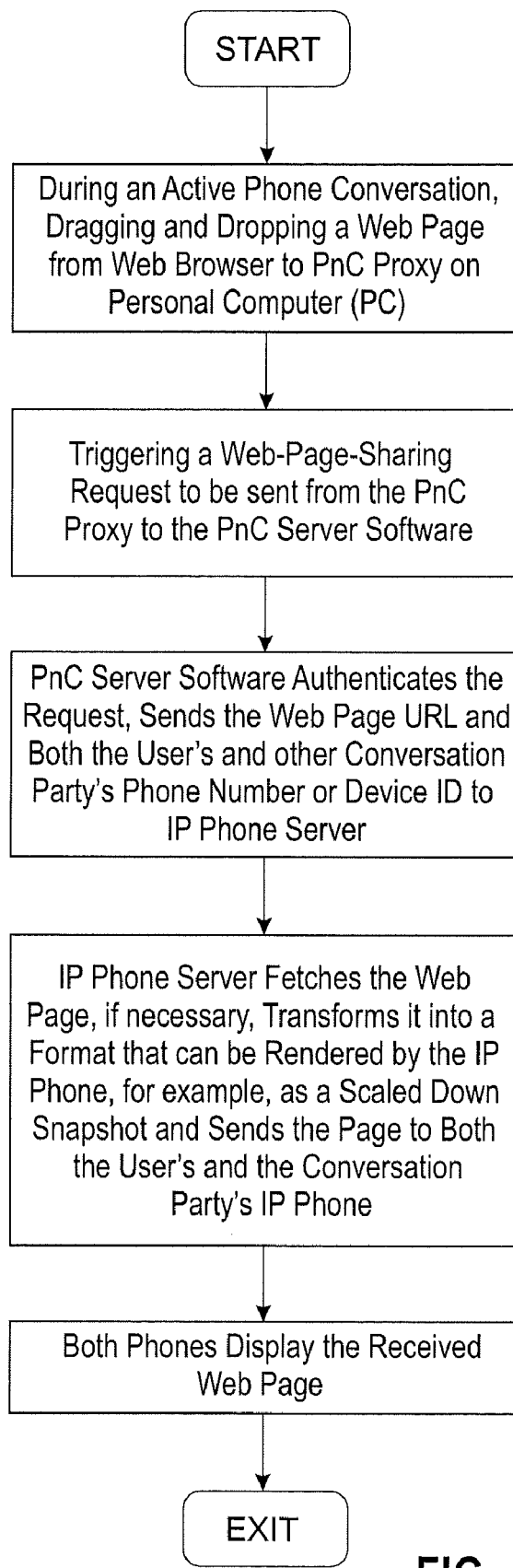
FIGS. 9A-9B illustrate examples of web-page-sharing function, which is one of a plurality of collaborative functions.
Figure 9B:
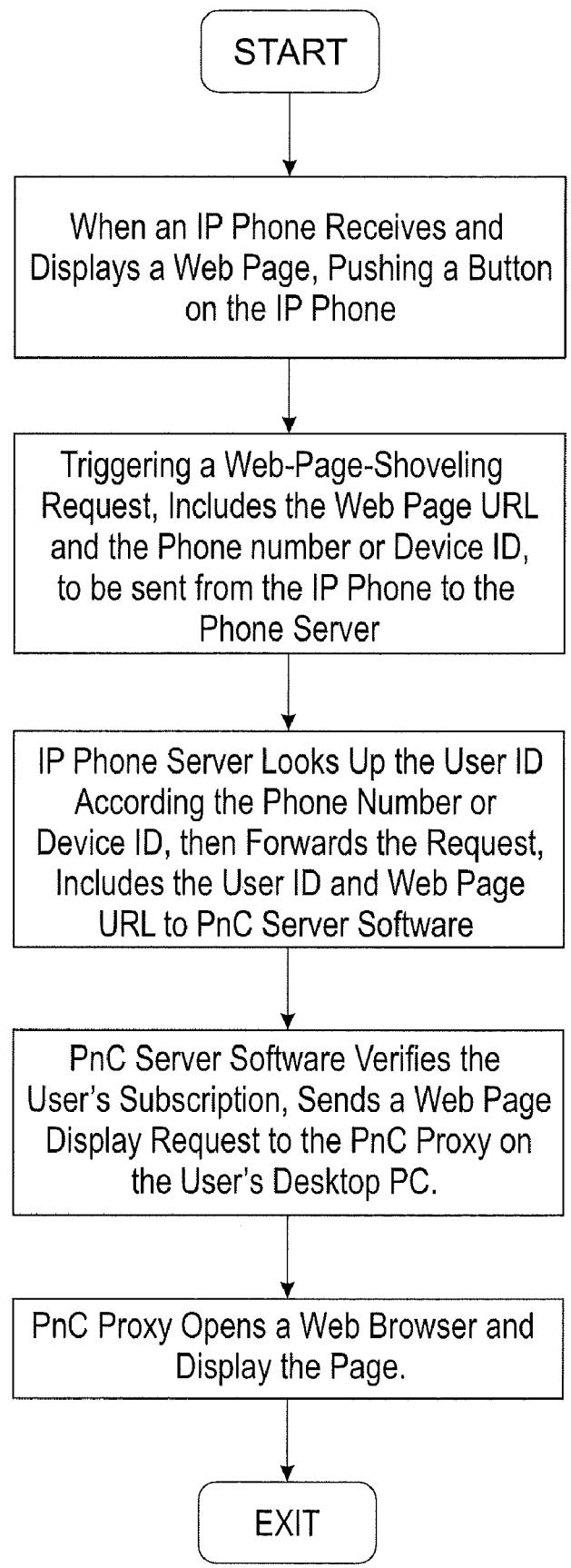

Referring to FIGS. 9A-9B, there are illustrated examples of sharing information. FIGS. 9A-9B illustrate examples of web-page-sharing functions, which is one of a plurality of collaborative functions.

Figure 10A:
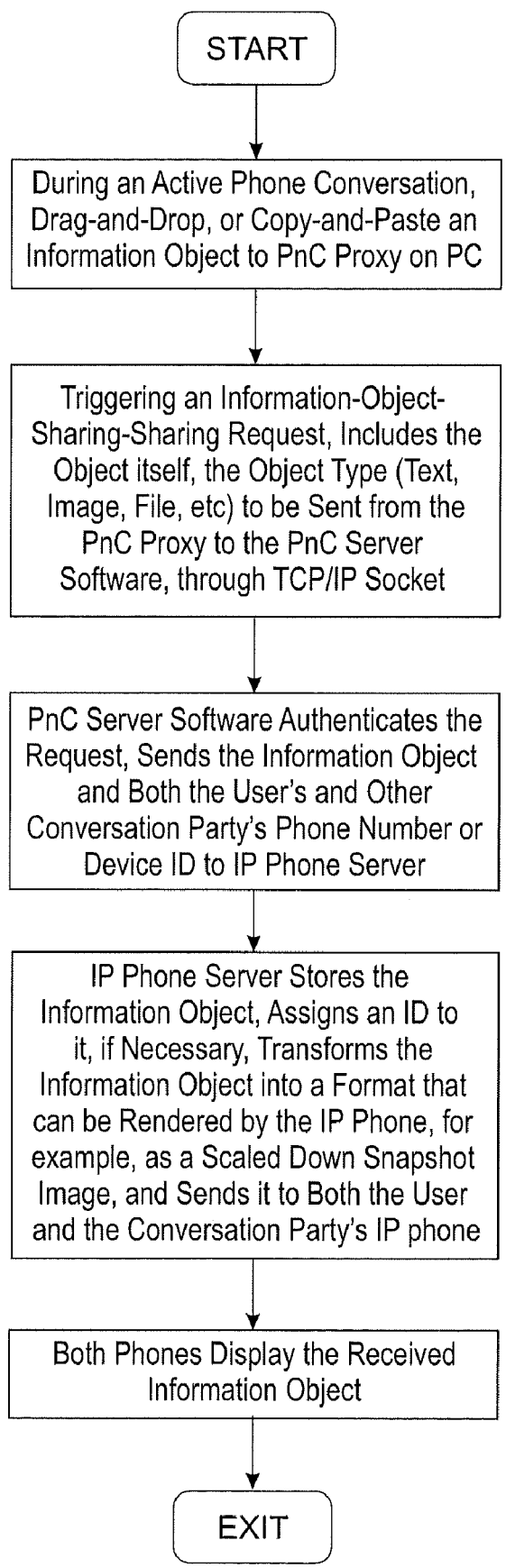
FIGS. 10A-10B illustrate examples of information-object-sharing function, which is one of a plurality of collaborative functions.
Figure 10B:
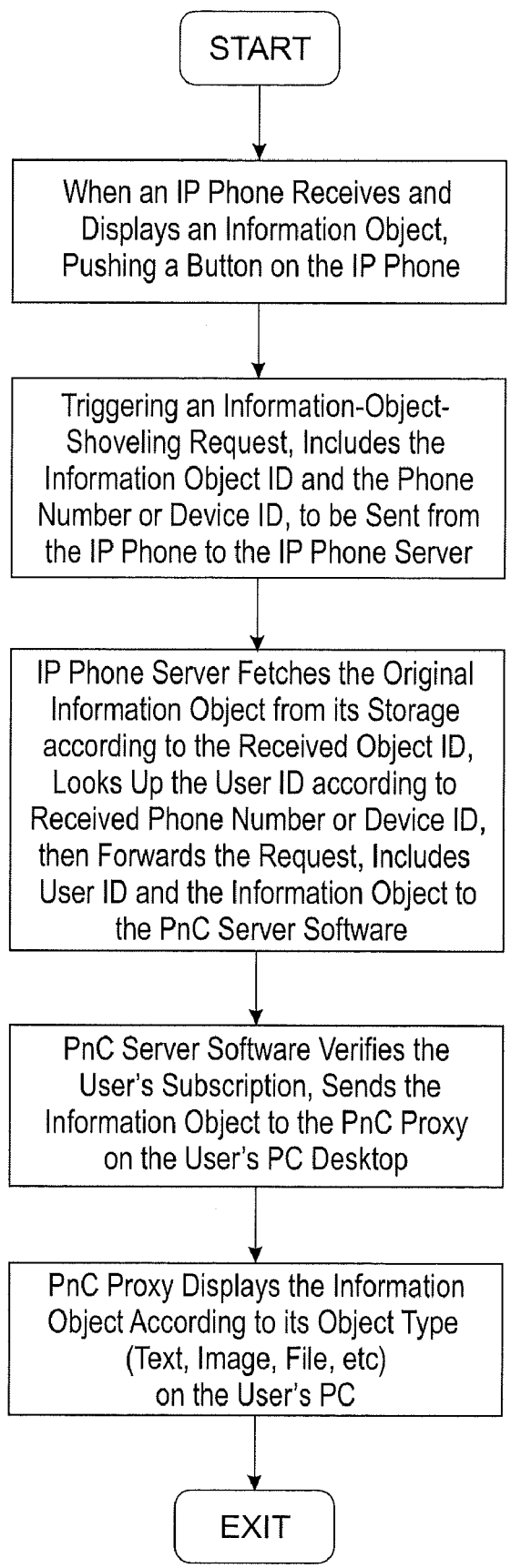

Referring to FIGS. 10A-10B, there are illustrated examples of information-object-sharing function, which is one of a plurality of collaborative functions. FIGS. 10A-10B illustrate examples of object-sharing functions.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of combining personal computer and IP phone by way of local area network forming a device team, said method comprising:
    connecting an IP phone to a local area network;
    connecting a personal computer to said local area network;
    installing a phone and computer (PnC) proxy software on said personal computer, said PnC proxy software providing a plurality of user interface elements representing said IP phone to a user;
    processing registration, subscription, authentication, and a plurality of collaborative functions between said IP phone and said personal computer on a second server, said second server running a PnC server software; and
    using said PnC server software to coordinate communications between, an IP phone server, said IP phone, and said PnC proxy software to effectuate said device team;
    wherein said plurality of collaborative functions includes a web-page-sharing function, said web-page-sharing function further comprising:
    said user drags and drops a web page onto the said PnC proxy software on said personal computer; and
    triggering a web-page-sharing request to be sent from said PnC proxy software to said PnC server software, and from said PnC server software to said IP phone server, wherein said IP phone server instructs the said web page to be displayed on said IP phone and the IP phone of the party who's in conversation with the said user;
    pushing a button on said IP phone; and
    triggering a web-page-sharing request to be sent from said IP phone to said IP phone server, and from said IP phone server to said PnC server software, wherein said PnC server software instructs said personal computer through said PnC proxy software to open a web browser, said web-page-sharing request further comprising a reference to a web page; and
    displaying on said personal computer said web page;
        wherein said plurality of collaborative functions includes a drop-to-dial function, said drop-to-dial function comprising:
    initiating by said user of a telephone number to dial request, said telephone number to dial request being generated by way of said personal computer;
    sending said telephone number to dial request to said PnC server software, said sending further comprising:
        verifying said user identity;
        looking up an IP phone number and corresponding authentication associated with said user; and
        returning a response;
    forming a request of dialing based in part on said response; and
    sending said request of dialing to said IP phone server;
    wherein said telephone number to dial request occurs when said user drags and drops said telephone number onto said PnC proxy software desktop;
    wherein said drop-to-dial function further comprising:
        verifying at said IP phone server said request of dialing; and
        effectuating placing of a telephone call;
    wherein said plurality of collaborative functions includes an information-sharing function, said information-sharing function further comprising:
    pushing a button on said IP phone; and
    triggering an information-sharing request to be sent from said IP phone to said IP phone server, and from said IP phone server to said PnC server software, wherein said PnC server software instructs said personal computer through said PnC proxy software to perform said information-sharing request, said information-sharing request further comprising a plurality of information; and
    displaying said plurality of information as enriched, or as complimentary version of information currently displayed on said IP phone;
    wherein said plurality of collaborative functions includes user defined customized information and task sharing delivered, through simple object access protocol (SOAP), to both said IP phone and said personal computer.

2. The method in accordance with claim 1, further comprising:
    connecting a laptop computer to said local area network.

3. The method in accordance with claim 1, further comprising:
    connecting a personal data assistant said local area network.

4. The method in accordance with claim 1, further comprising:
    connecting a consumer electronic device to said local area network, said consumer electronic device further comprising a web interface to enable information and task sharing.

5. The method in accordance with claim 1, further comprising:
    using a web server to verify a user identity, dynamically lookup an IP phone number associated with said user, download said PnC proxy software, and associate said PnC proxy software with said user and said IP phone number.

6. The method in accordance with claim 5, further comprising:
    keeping valid a registration in case of network communication interruptions by way of said PnC proxy software communicating with said PnC server software to revalidate said registration.

7. The method in accordance with claim 6, further comprising:
    subscribing to a service, wherein said user having valid said registration can subscribe to said plurality of collaborative functions.

* * * * *